United States Patent [19]
Jensen

[11] Patent Number: 5,870,105
[45] Date of Patent: Feb. 9, 1999

[54] SYSTEM AND METHOD FOR LOCAL STORAGE OF IMAGE DATA DURING OBJECT TO IMAGE MAPPING

[75] Inventor: Philip E. Jensen, Bellvue, Colo.

[73] Assignee: Hewlett-Packard Company, Palo Alto, Calif.

[21] Appl. No.: 658,905

[22] Filed: May 31, 1996

[51] Int. Cl.$^6$ .................................................. G06T 17/00
[52] U.S. Cl. .......................... 345/441; 345/419; 345/428; 345/433; 345/439
[58] Field of Search ...................................... 345/421, 422, 345/424, 427, 429, 433, 436, 437, 438, 439, 441, 121, 127, 419, 428

[56] References Cited

U.S. PATENT DOCUMENTS

| | | | |
|---|---|---|---|
| 5,077,681 | 12/1991 | Miyazawa | 345/419 |
| 5,363,475 | 11/1994 | Baker et al. | 345/422 |
| 5,422,733 | 6/1995 | Kaufman et al. | 343/424 |
| 5,467,446 | 11/1995 | Mikkelsen et al. | 345/443 |
| 5,469,535 | 11/1995 | Jarvis et al. | 345/430 |
| 5,475,803 | 12/1995 | Stearns et al. | 345/436 |
| 5,563,989 | 10/1996 | Bilyard | 345/426 |
| 5,566,341 | 10/1996 | Roberson et al. | 395/800.15 |
| 5,651,104 | 7/1997 | Cosman | 345/428 |
| 5,664,082 | 9/1997 | Chen et al. | 345/436 |
| 5,670,981 | 9/1997 | Jensen | 345/433 |
| 5,734,753 | 3/1998 | Bunce | 382/237 |

*Primary Examiner*—Stephen S. Hong

[57] ABSTRACT

A hybrid object to image mapping system and method includes a fragment generator that can be employed in conjunction with an interpolator within an image accelerator. The fragment generator includes a forward mapping mechanism for forward mapping an object data array from object space to image space so as to generate an object address set including image space addresses for each of the object data points, a pixel traversal mechanism for receiving and traversing the object address set to determine what pixels in the image space are located within an area of the object data set, and a reverse mapping mechanism for receiving pixel address data and determining at least two distances for each of the pixels within the area and for reverse mapping each of the distances from the image space to the object space relative to said data values in the local data buffer. In architecture, the forward mapping mechanism, the pixel traversing mechanism, and the reversed mapping mechanism are preferably pipelined in the foregoing sequential order. Thus, the data values from the object data array and the transformed distance values can be for further processing by a scaling operation such as interpolation or minification with a minimum amount of hardware and without reducing image quality.

20 Claims, 6 Drawing Sheets

LOCAL DATA BUFFER

SYSTEM AND METHOD FOR LOCAL STORAGE OF IMAGE DATA DURING OBJECT TO IMAGE MAPPING

FIELD OF THE INVENTION

This invention generally relates to image processing, and more particularly, to a system and method that provides for local storage of image data during object to image mapping.

BACKGROUND OF THE INVENTION

In image processing on a computer-based system, the image is typically rendered, or drawn, via a graphics subsystem of the computer-based system. Integral to virtually all types of imaging processing performed by a graphic subsystem is the mapping of the image from object space to image space (i.e., pixels in the image space) and/or the mapping of the image from image space to object space. These two mapping operations have associated with them several advantages and disadvantages, a few of which are delineated below.

First, when mapping from object space to image space, it is possible to traverse the object data set only once in order to complete the transformation to image space. This is advantageous in, that it allows for a stream-based architecture which is particularly well suited for a pipelined operation. It is well known in the industry that pipelining the operation of a graphic subsystem increases the speed and efficiency of the processing. A disadvantage of mapping from object space to image space is that it can only be used for generating image pixels that are generated artificially. Accordingly, this method is typically restricted to use in three-dimensional graphics accelerators where the images are synthetically generated. Thus, this method is not presently used for image or volumetric processing methods.

Second, when mapping from image space to object space, it is possible to maintain a reference from the image pixels to the object data making it well suited for use in image or volumetric processing. However, a disadvantage of mapping from image space to object space in a computer-based system is that it requires a great deal of hardware to support the operation of addressing into the object space. For example, such a system would require a relatively large amount of random access memory (RAM) and a controller for managing the flow of data into and out of the RAM. Typically, the amount of RAM required necessitates that it be placed on a separate chip (i.e., integrated circuit) and connected to the graphics subsystem. This is undesirable because it greatly increases the cost and complexity of the system.

While the hardware required to support mapping from image space to object space proves to be a substantial disadvantage, the hardware can be optimized, but only at the cost of image quality. For instance, in order to reduce the hardware overhead, the number of bits of data may be reduced, a less computationally intensive transformation scheme may be utilized, or the amount of on board memory may be reduced, all of which degrade the quality of the image. Nonetheless, this method is widely used in hardware texture mapping systems in order to associate texture data to a particular pixel in the image space.

Hence, a heretofore unaddressed need exists in the industry for an object imaged mapping system and method that requires a minimum amount of hardware overhead without reducing image quality.

SUMMARY OF THE INVENTION

The present invention overcomes the inadequacies and deficiencies of the prior art as disclosed hereinbefore and as well known in the industry. The present invention provides for a fragment generator for hybrid object to image mapping that can be employed in conjunction with an interpolator within an image accelerator. The fragment generator has minimum hardware overhead requirements, and therefore, allows the image data to be stored locally with respect to the image accelerator.

Simply stated, a fragment generator in accordance with the present invention comprises a forward mapping mechanism, a pixel traversing mechanism, and a reversed mapping mechanism. In architecture, the forward mapping mechanism, the pixel traversing mechanism, and the reversed mapping mechanism are preferably pipelined in the foregoing sequential order.

The forward mapping mechanism is configured to receive an object data array and to perform a forward mapping operation on the object data array in order to transfer the object data array from object space to image space. The forward mapping mechanism of the present invention supports the full set of homogenous affine transformations. In the image space, the object data array comprises an object address set of floating point values which define the pixels of the output image. In addition, the forward mapping mechanism takes the data values from the object data array and places them in a local data buffer for subsequent use in mapping the image space pixels of the output image back to the local object space, as described below.

The pixel traversing mechanism is configured to receive the object address set from the forward mapping mechanism and to traverse the output image space in order to locate all the pixels within the object address set that comprise the output image. This can be done any number of suitable ways, but preferably with the Jensen Serpentine algorithm. For each pixel of the output image, the pixel traversing mechanism also identifies a reference point from the object address set.

The reverse mapping mechanism is configured to receive the addresses of each output pixel and the corresponding reference point, and to determine therefrom one or more distance values "d" for each pixel representative of a distance between the pixel and its associated reference point. The reverse mapping mechanism then performs reverse mapping to transform the distance values "d" from image space to object space relative to the local object space. Thus, in accordance with a feature of the present invention, the forward mapping transformation performed by the forward mapping mechanism and the reverse mapping transformation performed by the reverse mapping mechanism are substantially the inverse of one another. This ensures that the distance values "d" are returned to the local object space.

Once the distance values "d" have been reverse mapped to the object space by the reverse mapping mechanism, they are utilized to generate scalar coefficients for use in a subsequent scaling operation, such as interpolation or minification, that is performed on the data in the local data buffer. The scaling operation produces the intensity values that are mapped to the output pixels in a frame buffer. Thus, a fragment generator and the associated scaling operation work in conjunction with one another to perform geometric transformation with a minimum amount of local hardware because the amount of data from the object data array is relatively small and is only passed over once before being removed.

The present invention can also be thought of as providing for a hybrid object to image mapping method for mapping image data on a computer-based system, comprising the following steps: receiving an object data array comprising a plurality of object data points in object space, each point having an associated data value; placing the data values in a local buffer; forward mapping the object data array from object space to image space so as to generate an object address set comprising an image space address for each object data point; traversing said object address set to determine the pixels in the image space that are located within an area defined by the object address set; determining at least one distance for each pixel within the area; and reverse mapping each distance from image space to object space relative to the data values in the local data buffer. Subsequently, the distance values can be utilized to generate scalar coefficients for use in a scaling operation, such as interpolation or minification. The scaling operation produces intensity values that can be mapped to the output pixels in a frame buffer for display.

The hybrid object to image mapping system and method of the present invention have many advantages, a few of which are delineated hereafter as examples.

An advantage of the hybrid object to image mapping system and method of the present invention is that they can be employed with virtually any conventional imaging operation as within an image accelerator.

Another advantage of the hybrid object to image mapping system and method of the present invention is that they provide a scheme that utilizes a minimum amount of local hardware without reducing image quality.

Another advantage of the hybrid object to image mapping system of the present invention is that they provide for a fragment generator that is simple in design, efficient in operation, and relatively inexpensive to manufacture.

Other features and advantages of the present invention will become apparent to one skilled in the art upon examination of the following drawings and detailed description. It is intended that all such additional features and advantages be included herein within the scope of the present invention, as defined by the appended claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference to numerals designate corresponding parts throughout the several views.

DETAILED DESCRIPTION OF THE PREFERRED EMBODIMENT

The following description is of the best presently contemplated mode of carrying out the present invention. The description is not to be taken in a limiting sense but is made merely for the purposes of describing the general principles of the invention. The scope of the invention should be determined by referencing the appending claims.

I. Architecture

A fragment generator 10 in accordance with the present invention performs hybrid object to imaging mapping of image data from object space to image space. The preferred embodiment of the fragment generator 10 is described in connection with an interpolator 12 for performing two-dimensional (2-D) transformations and up sampling interpolations. However, it should be noted that the fragment generator 10 of the present invention is equally well suited for minification or down sampling, and for three-dimensional (3-D) volumetric rendering, as would be obvious to one of ordinary skill in the art as direct extrapolations from the teachings herein.

Figure 1:
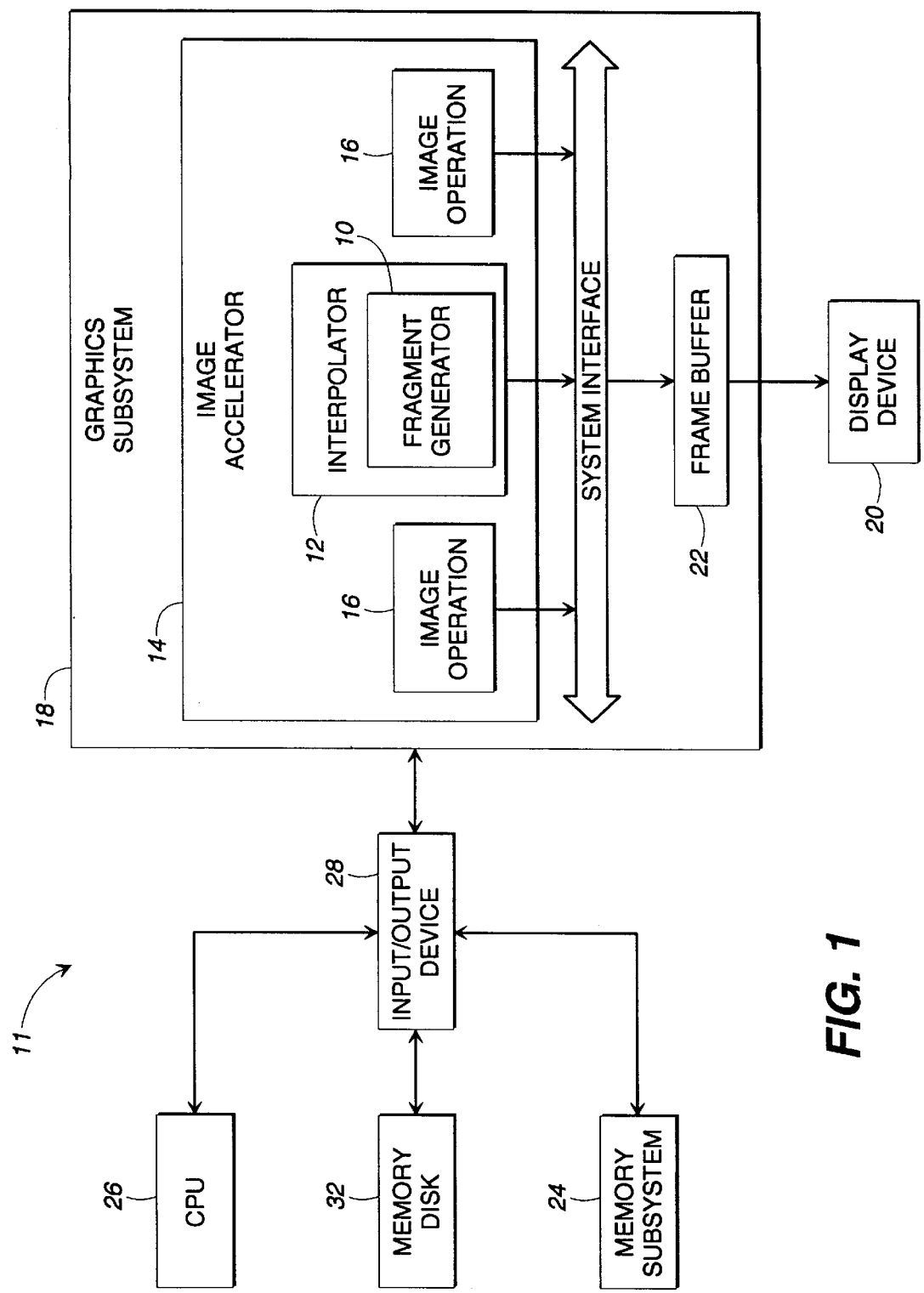
FIG. 1 is a block diagram illustrating the fragment generator of the present invention as implemented within a computer-based system.

As illustrated in FIG. 1, the fragment generator 10 of the preferred embodiment is shown in the context of a computer system 11 as an integral part of the interpolator 12 that is located within an image accelerator 14. As previously noted, fragment generator 10 can alternatively be connected to a minificator or other similar device for performing scaling operations on the output from the fragment generator 10.

In addition to the interpolator 12, the image of accelerator 14 may include one or more other imaging operations 16, such as a convolver or window/level mapper. The image accelerator 14 is incorporated as part of a graphic subsystem 18 in order to speed up the processing of an image for displaying on a display device 20. Generally, once the image has been processed by the image accelerator 14, the resultant image data is sent to a frame buffer 22 from which it is subsequently retrieved for displaying on display device 20.

The image that is processed by the graphic subsystem 18 is typically retrieved from an associated memory subsystem 24 or artificially generated by a central processing unit (CPU) 26. The memory subsystem 24, CPU 26 and graphic subsystem 18 are interconnected via an input and/or output device 28 as shown in FIG. 1. In addition, a memory disk 32 is provided for storage of models larger than that which can be accessed in the memory subsystem 24.

Figure 2:
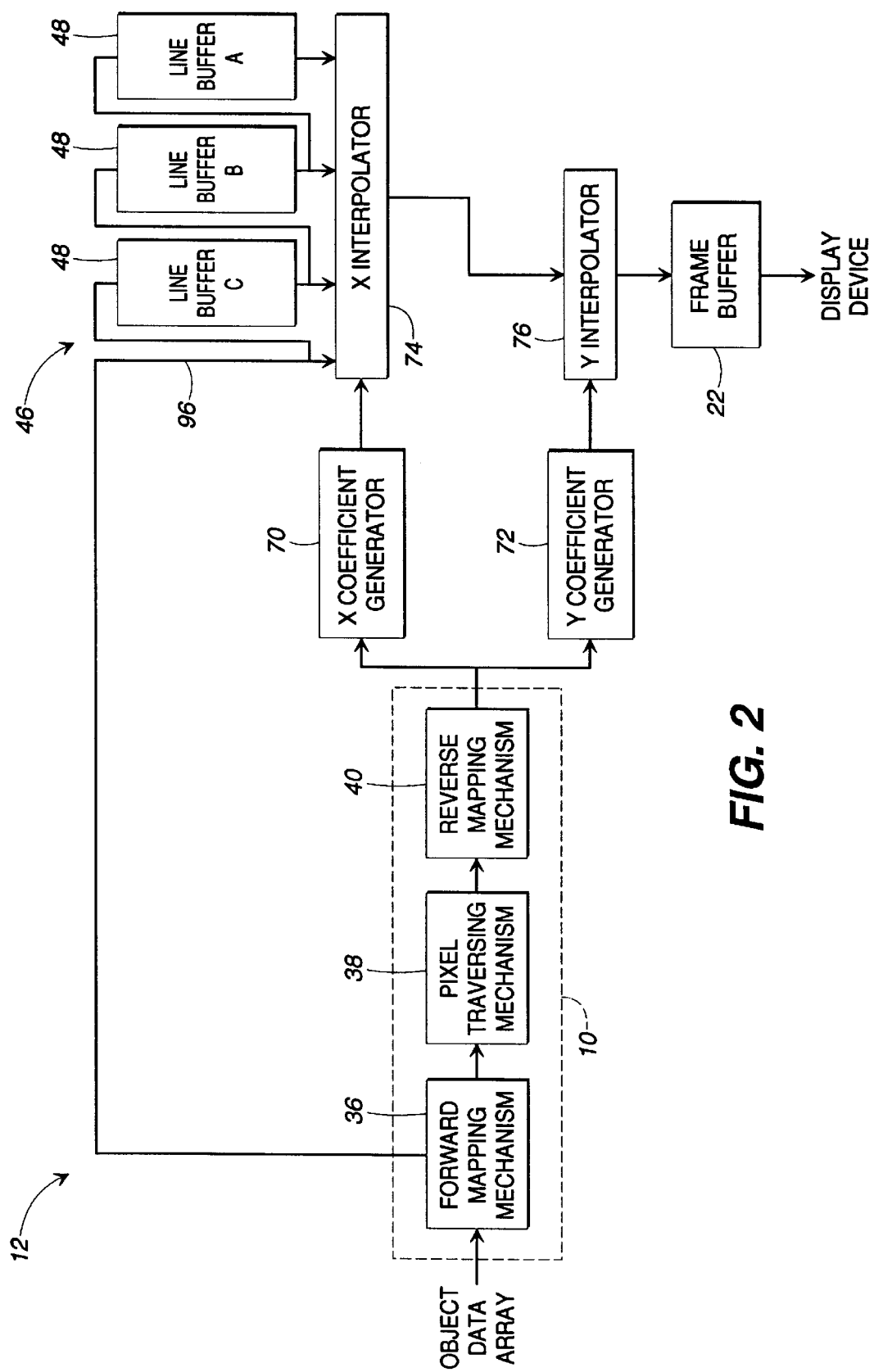
FIG. 2 is a block diagram illustrating the architecture and functionality of the fragment generator and the interpolator of FIG. 1.

With reference now to FIG. 2, illustrated is the interpolator 12 including the fragment generator 10 architecturally arranged in a simple pipeline configuration. The interpolator 12, including the fragment generator 10, is configured to receive an object data array from the memory subsystem 24 or the CPU 26, and then to generate therefrom image pixel addresses and associated data values that are subsequently sent to the frame buffer 22 prior to being displayed on display device 20. In accordance with the present invention, the fragment generator 10 comprises a forward mapping mechanism 36, a pixel traversing mechanism 38, and a reverse mapping mechanism 40.

Figure 3:
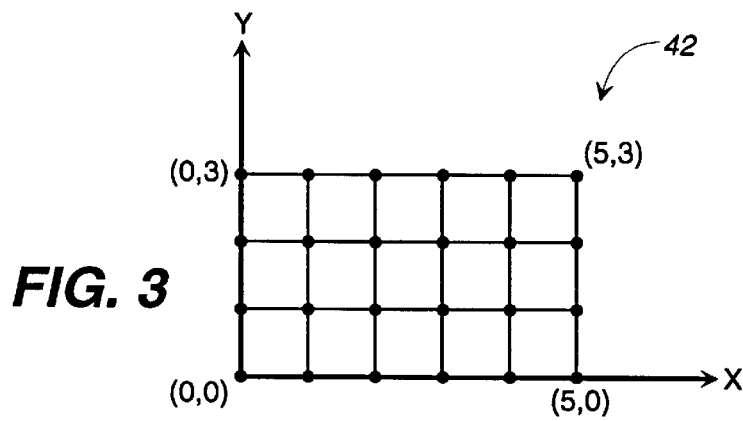
FIG. 3 is a graphical illustration of an object data array.
Figure 4:
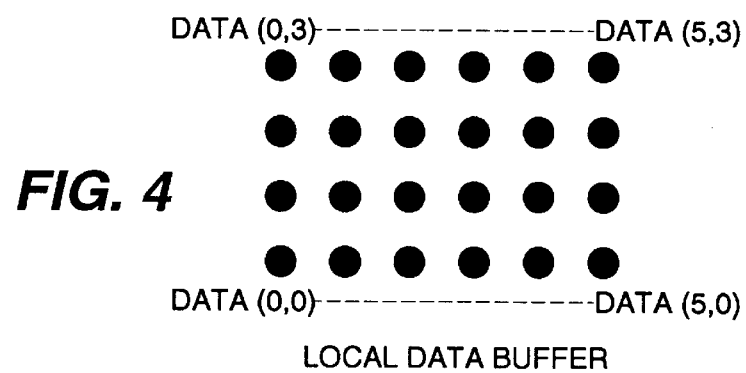
FIG. 4 is a schematic illustration of the data points taken from the object data array of FIG. 3 and stored in a local data buffer.

The forward mapping mechanism 36 performs a forward mapping operation on an input object data array configured as a grid 42 in a regular, non-rotated fashion as shown in FIG. 3. Each vertex of the grid represents an address of a data point representing some scalar value related to a color intensity, such as a gray scale or RGB scale. At this point, the addresses of the vertices on the grid 42 do not relate to any particular position on the screen of the display device 20, although it is useful to think of each vertex as being a one pixel unit apart in both the X and Y directions. The data associated with each vertex is taken from the input object data array and stored in a local data buffer 46 (FIG. 2), retaining their original orientation as shown in FIG. 4. For purposes of the preferred embodiment, the local data buffer 46 is implemented via line buffers 48 (FIG. 2) as will be discussed in more detail below.

Figure 5:
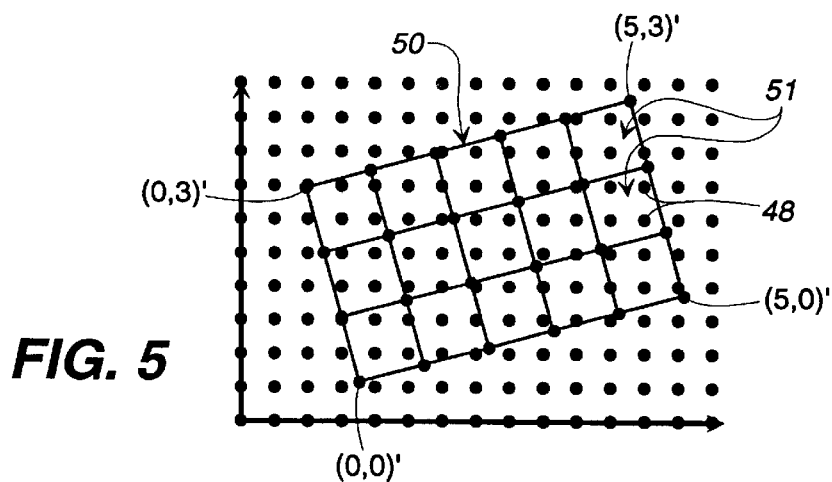
FIG. 5 is a graphical illustration of the image space representation of the object data array of FIG. 3.

The forward mapping mechanism 36 transforms the object data array from object space, as shown in FIG. 3, to image space, as shown in FIG. 5, by processing the addresses of each vertex through a 3×3 forward matrix operation, such as a rigid body transformation in a preferred embodiment. However, it is noted that the fragment generator 10 of the present invention is compatible with the full set of homogeneous affine transformations as described in Foley et al., "Computer Graphics Principles and Practice," 2nd Ed., Addison-Wesley Publishing Co. (1990). For purposes of the preferred embodiment, the rigid body transformations ensure that the object being transformed is not distorted in any way, (i.e., the angle of the corners remain consistent throughout the transformation). Accordingly, the forward mapping mechanism 36 performs the following transformation operations in the designated order: (1) translate the data so that the (0,0) is at the point in the data where the center of rotation lies, (2) scale the data, (3) rotate the data, and (4) translate the data so that the center of rotation is at the appropriate location in the image space.

The result of the forward matrix operation is an object address set 50 that represent the location of the data points in the image space (e.g., the display device 20), as shown in FIG. 5. The object address set 50 comprises a plurality of source data areas 51. A source data area is a special subset defined by three or more object address points in the image space. Thus, in its simplest form, an inputted object data array may comprise as few as three data points or vertices defining a triangle source data area. Further, note that the object address points may be represented by a non-integer value. For instance, the original data location (0,0) in the object space may now be located at (3.123, 2.987) in the image space. Thus, as shown in FIG. 5, the output image is generated by the pixels 48 residing within respective source data areas 51 as defined by the object address set, as denoted by (object space coordinates)'.

As an alternative to performing a 3×3 forward matrix operation on the object data array, the CPU 26 can be programmed to perform the forward mapping of the forward mapping mechanism 36 with a transformed base address and address increments. In this configuration, the base address locates the point of the output image that corresponds with the first data point in the data object array, e.g., the (0.0) point. The address increments specify the change in the address in the image space that correspond to a single pixel movement in the object space, for instance, in the X and Y directions. Please refer to FIG. 3 where an object data array 42 is shown in object space and to FIG. 5 where the transformed object data array is illustrated. In order to generate the object address set of FIG. 5 from the base address location (0,0)', each subsequent vertex is located from the base address by adding the address increments in the noted directions, for instance, in the X and Y directions. Further, this transformation includes the operations of translation and rotation as well known in the industry.

The pixel traversing mechanism 38 receives the transformed addresses of the object data array and traverses the object address set to determine which pixels in the image space will be drawn in order to render the output image. These pixels are referred to hereafter as image pixels. While several well known methodologies exist for traversing the source objects, such as raster scan or double Breshenham line drawing, the preferred method is via the Jensen Serpentine algorithm.

Figure 6A:
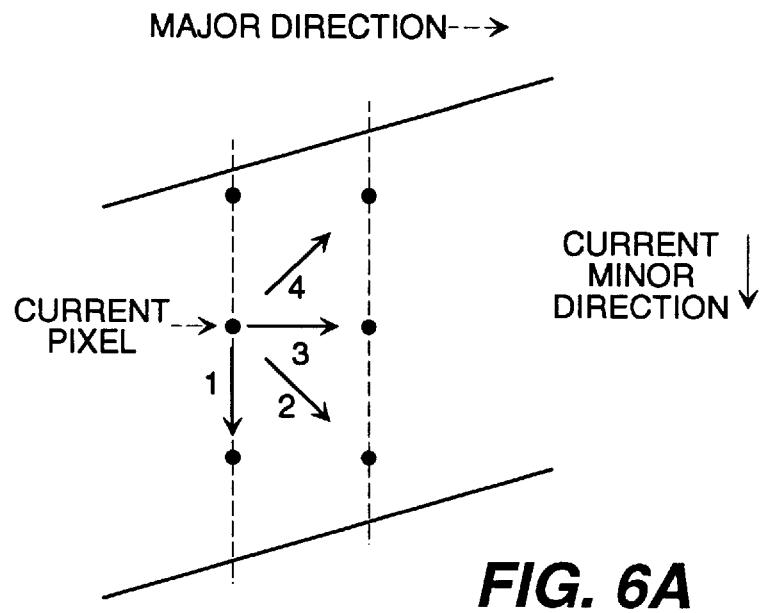
FIGS. 6A and 6B are schematic illustrations of the Jensen Serpentine algorithm.
Figure 6B:
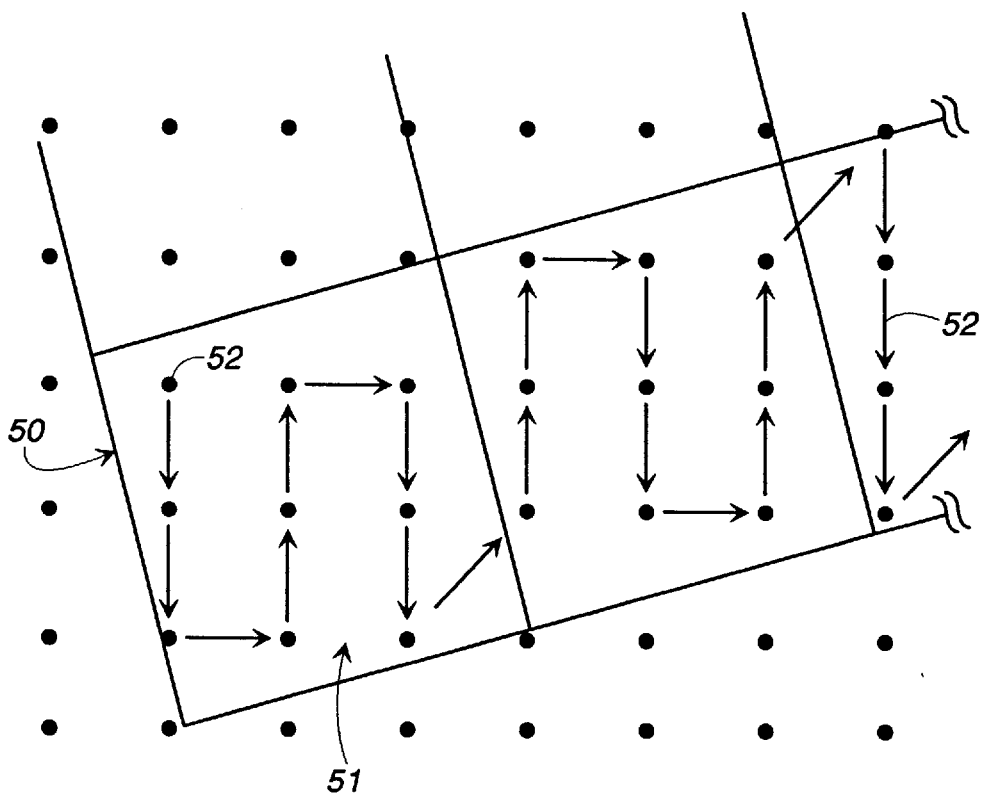

Briefly, the Jensen Serpentine algorithm chooses pixels in a circuitous method through the available area defined by the object address set. Pixels which are chosen are always within the bounds of the object address set allowing for the maximum speed possible in traversing the image space. Graphical illustrations of the operation of the Jensen Serpentine algorithm are provided in FIGS. 6A and 6B. In general, the traversal methodology of the Jensen Serpentine algorithm starts with a pixel that is farthest back in the direction that the data will be drawn. This direction is defined as the major direction as is used in line drawing algorithms. The minor direction is 90 degrees with respect to the major direction and can change from negative (i.e., down) to positive (i.e., up) as illustrated in FIG. 6B, where the draw line 54 goes down and then up, both in the minor direction. From a first pixel 52, the method chooses a next pixel in one of the four possible directions as illustrated in FIG. 6A. The four possible directions are (1) negative in the minor direction only, (2) negative in the minor direction and positive in the major direction, (3) positive in the major direction only, or (4) positive in the major direction and positive in the minor direction. This next pixel is chosen in above listed order of consideration with the limitation that the next pixel be within the bounds of the object address set. Thus, if the first possible pixel is outside the bounds of the object address set, then the next possible pixel is considered. Similarly, if that pixel is outside the bounds of the object address set, then the third possible pixel is considered, and so forth and so on. As shown in FIG. 6B, from pixel 52, the next two pixels chosen are the first ones considered, but the following pixel chosen is the third one considered because the first two are out of the bounds of the object address set.

As each image pixel is chosen via the traversal methodology, such as the one described above, an address of a respective reference corner within a particular source data area 51 is also noted for each image pixel. Thus, in the present configuration, the pixel traversing mechanism 38 locates the image pixels within a particular source data area 51 defined by four source object address points (i.e., corners) and then sends the image pixel address with a corresponding reference point (one of the four corner addresses of the source data area 51) to the reverse mapping mechanism 40.

The reverse mapping mechanism 40 (FIG. 2) receives the image pixel addresses and the respective reference point addresses and initially calculates one or more distance values "d" for each pixel. In the preferred embodiment, the distance values "d" are determined for each image pixel, and more particularly, a $d_x$ value and a $d_y$ value are determined in accordance with Equations (1) and (2) below:

$$d_x = |X_{ref\ corner} - X_{pixel}| \qquad (1)$$

$$d_y = |Y_{ref\ corner} - Y_{pixel}| \qquad (2)$$

where $X_{ref\ corner}$ is the X coordinate of the reference point address, $X_{pixel}$ is the X coordinate of the image pixel, $Y_{ref\ corner}$ is the Y coordinate of the reference point address, and $Y_{pixel}$ is the Y coordinate of the image pixel, all of which are in the image space. These are simple arithmetic operations that are easily implemented via integrated circuit technology.

These distance values $d_x$ and $d_y$ are then reverse mapped from the image space to the object space relative to the local object data space (i.e., the local data buffer 46). In order for the reverse mapping to place the distance values in the object space relative to the local object data, e.g., in unit spacing, the reverse matrix operation of the reverse mapping mechanism 40 is substantially the inverse of the forward mapping operation described hereinbefore with reference to the forward mapping mechanism 36.

For instance, in the preferred embodiment, each distance is first translated to be relative to the (0,0) corner of the local data space. Next, the distance values are transformed by a reverse matrix operation including rotating by the angle used in the forward mapping but in the opposite direction, and then scaling by a factor that is the inverse of the forward scaling, that is, 1/(forward scaling value). Translation is not a factor in the reverse mapping because the image data need only be rotated relative to the (0,0) point of the local data buffer 46. Thus, the reverse matrix operation can be performed with a 2×2 matrix function in the preferred embodiment. If a non-rigid body operation is used, this must be a full 3×3 matrix which includes perspective.

Once the distance values $d_x$ and $d_y$ have been transformed back into the local object space, they are sent to a X coefficient generator 70 and a Y coefficient generator 72, respectively.

Figure 7:
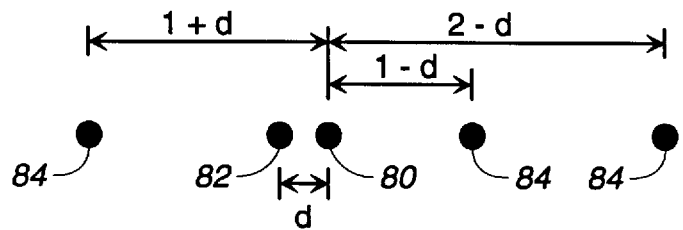
FIG. 7 is a schematic illustration of a coordinate relationship defining the distance value "d"

The X and Y coefficient generators 70, 72 generate coefficients used by a X interpolator 74 and a Y interpolator 76, respectively. Therefore, depending upon the interpolation scheme implemented by the respective interpolators 74 and 76, the operation of the X coefficient generator 70 and the Y coefficient generator 72 may vary slightly. In the case of the preferred embodiment, where the X interpolator 74 performs cubic interpolation and the Y interpolator 76 performs cubic interpolation, the X and Y coefficient generates 70, 72 each generator four coefficients C0, C1, C2, and C3. The values of the coefficients C0–C3 are a cubic function of the distance from the image pixel location to the nearby object address points. For instance, with reference to FIG. 7, the distance value "d" calculated by the reverse mapping mechanism 40 is depicted as the distance from the image pixel 80 to the corner reference point 82. In addition, the distances from the image pixel 80 to other nearby object address points 84 in a single direction (e.g., X or Y) are also stated in terms of distance value "d." For each nearby object address point, a coefficient for use in interpolating the data in the local data buffer 46 can be calculated in accordance with the Equation (3) below:

$$C = \begin{cases} (A+2)*|d|^3 - (A+3)*|d|^2 + 1, & 0 \leq |d| < 1 \\ A*|d|^3 - 5*A*|d|^2 + 8*A*|d| - 4*A, & 1 \leq d < 2 \\ 0, & 2 \leq |d| \end{cases} \quad (3)$$

In Equation (3), the value A is a user-programmable parameter with values typically between −3 and 0 as is defined in George Wolberg, "Digital Image Processing" 1st Ed., ISBNO-8186-8944-7, pp 129–131. By incorporating the distance values "d" indicated in FIG. 7 for each of the aforementioned nearby object address points, the following coefficient values, C0, C1, C2 and C3 can be generated in accordance with Equation (4) below:

$C0 = A*d^3 - 2*A*d^2 + A*d$ $C1 = (A+2)*d^3 - (A+3)*d^2 + 1$ $C2 = -(A+2)*d^3 + (2*A+3)*d^2 - A*d$ $C3 = -A*d^3 + A*d^2$ (4)

In this form, as expressed in Equation (4), the number of multipliers required to derive the coefficient values in the X coefficient generator 70 and the Y coefficient generator 72 is reduced from what would be required with Equation (3) above. In addition, the number of adders required by X and Y coefficient generators 70, 72 is likewise reduced. This improves performance, reduces cost, and takes up less space of the image accelerator 14 (FIG. 1).

Figure 8:
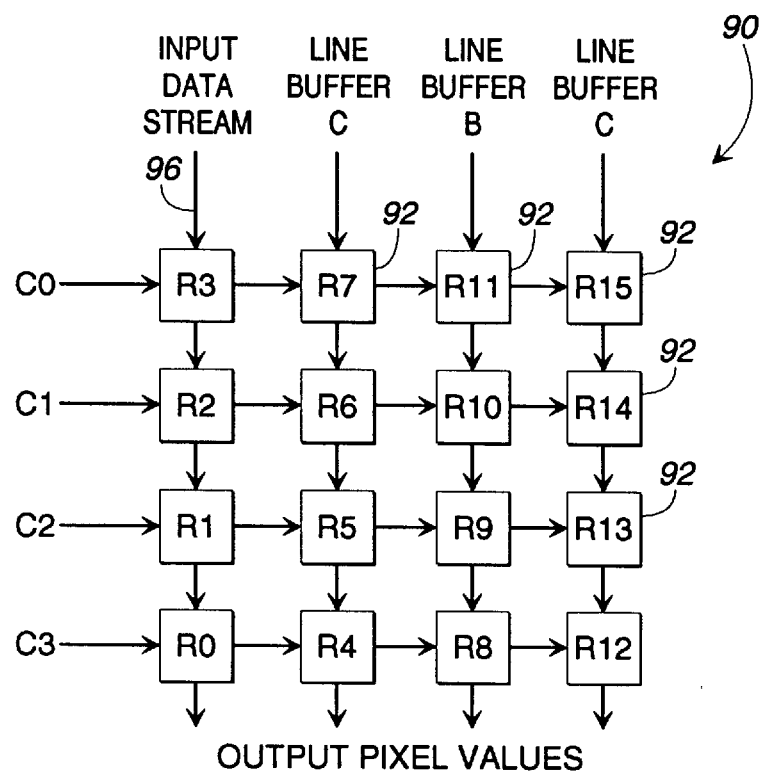
FIG. 8 is a schematic illustration of a 4×4×1 cubic convolution kernel utilized for the X interpolator of FIG. 2.

Referring back to FIG. 2, an X interpolator 74 receives the X coefficients C0, C1, C2, and C3 from the X coefficient generator 70 for performing cubic interpolation on the source data received from the line buffers 48 of the local data buffer 46. While the X interpolator 74 performs cubic interpolation, it is also known that other suitable interpolation schemes, such as linear or nearest-neighbor are also supported by the hybrid mapping scheme of the present invention by changing the values generated in the coefficient generators. For example, in the case of a linear interpolation, C0=0, C1=1−dx, C2=dx and C3=0. The X interpolator 74 comprises a 4×4×1 convolution kernel 90 as shown in FIG. 8. In each column of kernel 90, there are four kernel registers 92 provided for performing one dimensional interpolation on four data points received from the line buffer 48 of the local data buffer 46.

The X interpolator 74 receives the source data from three cache line buffers 48 and an input data stream line 96 which comprise the local data buffer 46. The data values are sequentially taken from the object data array and serially loaded into the line buffers 48 which act in a first-in, first-out (FIFO) manner, filling line buffer A first, followed by line buffers B, and then line buffer C. Once all three line buffers are loaded with data, the image processing can begin. As data is being output from buffer C, it is also loaded into the end of buffer B and so on from buffers B to A, and from the input data stream to buffer C. Since the line buffers 48 must hold a full line of the object data they should be as long as the largest possible object array. This limitation can be overcome by performing multiple operations on subsets of the object data. With the appropriate circuit in place, the images can easily be seamlessly joined together allowing a very small line buffer to perform operations on much larger images. Since there is some trade off in speed in processing these overlapped regions, it is advantageous to make the line buffers as large as feasible. In the present invention, the size of the local data buffer 46 is relatively small, and therefore, is suitable for fabrication as on-board RAM with a minimum amount of hardware.

In accordance with a feature of the present invention, the local data buffer 46 stores the data values from the input object data array in a local object space so that the data can be interpolated by interpolator 12 in a single pass. This is possible because all the data necessary for the interpolation is confined to the data in the local data buffer 46 and there is no need to go outside the local data buffer 46 to derive the output pixel values. This is an advantage made possible by the fragment generator 10 which generates the distance values "d" relative to the local object space and corresponding to the source data contained in the local data buffer 46. In the preferred embodiment, line buffers 48 comprise shift registers which are easily implemented with integrated circuit technology and require little space so that they can be fabricated on board with the image accelerator 14.

Referring back to FIG. 2 again, the X interpolator 74 receives the coefficients C0, C1, C2, and C3 from the X coefficient generator 70. As shown in FIG. 8, the C0 coefficient is used for X interpolation with each source data value in registers R0, R4, R8, and R12, the C1 coefficient is used for each source data value in registers R1, R5, R9, and R13, the C3 coefficient is used for each source data value in registers R2, R6, R10, and R14, and the C3 coefficient is used with each source data value in registers R3, R7, R11, and R16.

In regard to the cubic interpolation of the X interpolator 74, as is well known in the industry, the appropriate coefficients are multiplied by the data values contained in their respective kernel registers 92 (i.e., R0–R16) and the values from each respective column are added together in order to derive a single pixel data value for each column. Thus, the output of X interpolator 74 comprises four pixel data values which are sent to the Y interpolator 76.

Figure 9:
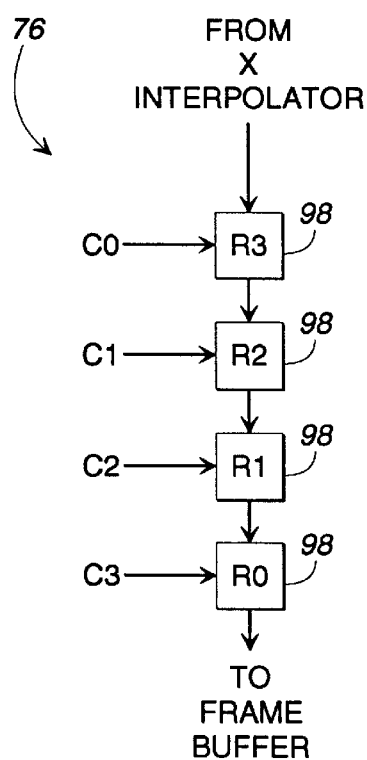
FIG. 9 is a schematic illustration of a 1×4×1 cubic convolution kernel utilized for the Y interpolator of FIG. 2.

At the Y interpolator 76, as illustrated in FIG. 9, four pixel data values from the X interpolator 72 are multiplied at the kernels 98 by the respective Y coefficients C0, C1, C2, and C3 as generated by the Y coefficient generator 72. Note that the Y coefficient generator 72 generates the coefficient C0–C3 with substantially the same equation as the X interpolator 74, i.e., Equation (4), though the distance value inputted into Equation (4) provided by the reverse mapping matrix 40 is value $d_y$. The Y interpolator 76 then adds the resulting product of the coefficients and pixel data values in order to derive a single output pixel value. The resultant pixel value is combined with the appropriate pixel address from the pixel traversing mechanism 38 at the frame buffer 22. A synchronization pulse is sent from the fragment generator which keeps the data values in synchronization with the data which is shifting through the line buffers and into the local data area.

II. Method of Operation

Figure 10:
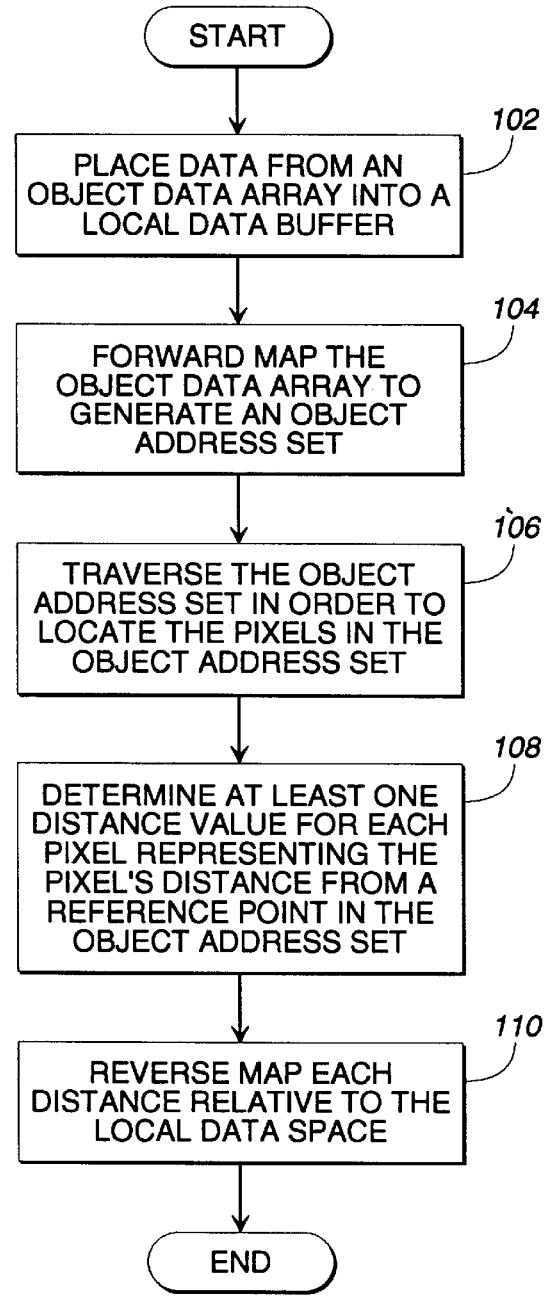
FIG. 10 is a flowchart of the operation of the fragment generator of FIG. 1 performing hybrid object to image mapping in accordance with the present invention.

The present invention also provides for a hybrid object to image mapping method for mapping image data that comprises the following steps as illustrated in the flowchart of FIG. 10. Initially, at block 102, the data values associated with an object data array are placed in a local data buffer 46. The data array is then forward mapped from object space to image space so as to generate an object address set, as indicated by block 104. It is noted that the forward mapping operation can be any one of the full set of homogeneous affine transformations, including perspective. In the preferred embodiment, however, the forward mapping is a rigid body transformation.

Next, the object address set is traversed in order to determine which pixels in the image space are located in the object address set, as indicated by block 106. As discussed above, there are numerous suitable traversing schemes, such as raster scan or double Breshenham, that can be used, though the preferred scheme is with the Jensen Serpentine algorithm as described in detail hereinbefore.

Next, at least two distances are determined for each pixel representing the distance from a reference point in the object address set, as indicated by block 108. These distance values provides a weighting factor that is applied to the data values in the local data buffer 46 during a subsequent scaling operation.

Lastly, each of the distances is reverse mapped from image space to object space relative to the data values in the local data space, as indicated by block 110. In accordance with a feature of the present invention, the forward mapping operation and the reverse mapping operation are the inverse of one another. This ensures that the reverse mapping places the distance values in local object space.

Upon completion of the aforementioned steps, the data values in the local data buffer and the distance values are in condition for further processing by a scaling operation such as interpolation (i.e., up-scaling, wherein the scale factor $\geq 1$) or minification (i.e., down-scaling, wherein the scale factor <1), as well known in the industry. In essence, the aforementioned steps efficiently prepare the data values and generated the distances in a manner to facilitate the scaling of the data values with a minimum amount of hardware and without sacrificing image quality.

In regard to the subsequent scaling operation, the data values in the local data buffer are interpolated in the preferred embodiment using the distance values mapped back to the local object space. In the interpolation, bi-cubic interpolation is used because of its favorable results, though bilinear, nearest-neighbor and a number of other interpolation schemes can also be utilized. The interpolation generates image pixel data values that are sent to a frame buffer for display on a display device.

In concluding the detailed description, it should be noted that it will be obvious to those skilled in the art that many variations and modifications may be made to the preferred embodiment without substantial departing from the principles of the present invention. All such variations and modifications are intended to be included herein within the scope of the present invention, as set forth in the following claims. Further, in the claims hereafter, the corresponding structures, materials, acts, and equivalence of all means or set plus function elements are intended to include any structures, materials, or acts for performing the function in combination with other claimed elements as specifically claimed.

Wherefore, the following is claimed:

1. A hybrid object to image mapping method for mapping image data on a computer-based system, comprising the steps of:

receiving an object data array comprising a plurality of object data points in object space, each said point having an associated data value;

placing said data values in a local data buffer, forward mapping said object data array from object space to image space so as to generate an object address set comprising image space addresses for each said object data point;

traversing said object address set to determine which pixels in said image space that are located within an area of said object data set;

determining at least one X and Y distance for each said pixel within said area said pixel being within said image space, said X and Y distance representing said pixel's distance from a reference point in said object data set; and reverse mapping each said distance from said image space to said object space relative to said data values in said local data buffer.

2. The method of claim 1, further comprising the step of interpolating said data values in said local data buffer with said distances in said image space in order to generate intensity values for each said area of said data object set.

3. The method of claim 1, wherein said step of forward mapping and said step of reverse mapping are substantially inverse operations.

4. The method of claim 1, wherein said step of traversing said object data space comprises the step of performing a Jensen Serpentine algorithm.

5. The method of claim 1, wherein said step of traversing said object data space comprises the step of performing a raster scan algorithm.

6. The method of claim 1, wherein said step of traversing said object data space comprises the step of performing a double Breshenham line drawing algorithm.

7. The method of claim 1, wherein said step of forward mapping comprises perspective transformation.

8. The method of claim 2, wherein said step of interpolating comprises the steps of:

generating coefficients based upon said distances; and performing bi-cubic interpolation on said data values in said local data buffer with said coefficients.

9. The method of claim 2, wherein said step of interpolating comprises bi-cubic interpolation.

10. A method for object to image mapping, comprising the steps of:

forward mapping an object data array from object space to image space so as to generate an object address set having at lease two edges;

traversing said object address set to determine which pixels in said image space that are located within said object address set;

determining a first distance from a first edge of said object address set and a second distance from a second edge of said object address set for each said pixel within said area, said first distance and said second distance representing each said pixel's distance from a reference point in said object address set; and reverse mapping each said first and second distances from said image space to said object space relative to data values in said local data buffer.

11. The method of claim 10, further comprising the step of interpolating data values from said object data array with said first and second distances in said image space in order to generate intensity values for each said pixel in said data object set.

12. The method of claim 10, wherein said step of forward mapping and said step of reverse mapping are substantially inverse operations.

13. A fragment generator for mapping image data, comprising:

a forward mapping mechanism for forward mapping an object data array from object space to image space so as to generate an object address set comprising image space addresses for each said object data point;

a pixel traversal mechanism for receiving and traversing said object address set to determine what pixels in said image space that are located within an area of said object data set; and a reverse mapping mechanism for receiving pixel address data and determining at least one X and Y distance for each said pixel within said area, said pixel being within said image space, said X and Y distance representing said pixel's distance from a reference point in said object data set and for reverse mapping each said distance from said image space to said object space relative to said data values in said local data buffer.

14. The fragment generator of claim 13, wherein said pixel traversal mechanism comprises means for performing a Jensen Serpentine algorithm.

15. The fragment generator of claim 13, wherein said forward mapping mechanism and said reverse mapping mechanism perform substantially inverse operations.

16. The fragment generator of claim 13, wherein said forward mapping mechanism performs rigid body coordinate transformation.

17. The fragment generator of claim 13, further comprising a local data buffer for storing data associated with points of said object data array.

18. The fragment generator of claim 17, further comprising an interpolator for interpolating said data in said local data buffer with distances in said image space in order to generate intensity values for each said pixel in said area of said data object set.

19. The fragment generator of claim 17, wherein said local data buffer comprises cache lines of a length substantially equal to a width of said data object array.

20. The fragment generator of claim 18, wherein said interpolator comprises a coefficient generator configured for generating an interpolation coefficients from said distances and a bi-cubic convolution kernel.

\* \* \* \* \*